US012586399B2

(12) United States Patent
Masuda et al.

(10) Patent No.: US 12,586,399 B2
(45) Date of Patent: Mar. 24, 2026

(54) DATE AND TIME FEATURE IDENTIFICATION

(71) Applicant: INTERNATIONAL BUSINESS MACHINES CORPORATION, Armonk, NY (US)

(72) Inventors: Satoshi Masuda, Nerima-ku (JP); Takaaki Tateishi, Yamato (JP); Toshihiro Takahashi, Nakano-ku (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 588 days.

(21) Appl. No.: 17/540,383

(22) Filed: Dec. 2, 2021

(65) Prior Publication Data

US 2023/0177856 A1      Jun. 8, 2023

(51) Int. Cl.
| | |
|---|---|
| *G06V 30/19* | (2022.01) |
| *G06F 18/24* | (2023.01) |
| *G06N 3/04* | (2023.01) |
| *G06N 5/022* | (2023.01) |

(52) U.S. Cl.
CPC ........ *G06V 30/19113* (2022.01); *G06F 18/24* (2023.01); *G06N 3/04* (2013.01); *G06N 5/022* (2013.01); *G06V 30/19147* (2022.01); *G06V 30/1916* (2022.01)

(58) Field of Classification Search
CPC ....... G06V 30/19113; G06V 30/19147; G06V 30/1916; G06F 18/24; G06F 18/217; G06N 3/04; G06N 5/022; G06N 3/08; G06N 5/01; G06N 20/00
See application file for complete search history.

(56) References Cited

U.S. PATENT DOCUMENTS

| | | | | | |
|---|---|---|---|---|---|
| 7,149,347 | B1 * | 12/2006 | Wnek | .................. | G06V 30/416 |
| | | | | | 382/209 |
| 8,099,322 | B2 * | 1/2012 | Watanabe | .......... | G06Q 30/0241 |
| | | | | | 705/26.1 |
| 11,429,895 | B2 * | 8/2022 | Yakovlev | ................. | G06N 5/01 |
| 11,663,523 | B2 * | 5/2023 | Polleri | ...................... | G06F 8/30 |
| | | | | | 706/12 |
| 11,734,629 | B2 * | 8/2023 | Lyman | ................... | G16H 30/40 |
| | | | | | 705/3 |
| 2005/0108630 | A1 * | 5/2005 | Wasson | ................. | G06F 40/169 |
| | | | | | 707/E17.084 |
| 2006/0195465 | A1 * | 8/2006 | Atchison | ............... | G06F 16/907 |
| | | | | | 707/999.102 |

(Continued)

OTHER PUBLICATIONS

Mell et al., "The NIST Definition of Cloud Computing", National Institute of Standards and Technology, Special Publication 800-145. Sep. 2011, pp. 1-7.

(Continued)

*Primary Examiner* — Belix M Ortiz Ditren
(74) *Attorney, Agent, or Firm* — Tutunjian & Bitetto, P.C.; Robert Richard Aragona

(57)                    ABSTRACT

Methods and systems for text processing include building a knowledge base using column names and associated functions from a code base. Classifiers are trained using the knowledge base and are cross-validated to determine accuracy scores. Text is processed using a selected classifier having a highest accuracy score from the classifiers to determine date/time features.

20 Claims, 10 Drawing Sheets

(56)                References Cited

U.S. PATENT DOCUMENTS

| | | | |
|---|---|---|---|
| 2007/0025704 A1* | 2/2007 | Tsukazaki | G06F 16/61 |
| | | | 386/230 |
| 2010/0250540 A1* | 9/2010 | Adda | G06F 16/2477 |
| | | | 707/E17.089 |
| 2019/0065467 A1* | 2/2019 | Dey | G06F 40/295 |
| 2021/0004435 A1* | 1/2021 | Xia | G06Q 50/16 |
| 2021/0004651 A1 | 1/2021 | Sainani et al. | |
| 2022/0076164 A1* | 3/2022 | Conort | G06N 20/00 |
| 2022/0300557 A1* | 9/2022 | Basu | G06F 16/9027 |
| 2023/0153280 A1* | 5/2023 | Rout | G06N 3/045 |
| | | | 706/25 |
| 2024/0330412 A1* | 10/2024 | Frazier | G06F 18/241 |

OTHER PUBLICATIONS

Su, Ting, et al. "A survey on data-flow testing", ACM Computing Surveys (CSUR), vol. 50, No. 1, Article 5. Mar. 10, 2017, pp. 1-35.
Zhou, Ying, et al. The research of concept extraction in ontology extension based on extended association rules. In2016 IEEE International Conference of Online Analysis and Computing Science (ICOACS). May 28, 2016, pp. 111-114.
Anonymous. "Contextual Feature Generation Using Meta Learning for Automated Machine Learning", IP.Com, Prior Art Database Technical Disclosure. Dec. 7, 2020, pp. 1-6.
Vlachos, Michail, et al. "On periodicity detection and structural periodic similarity", InProceedings of the 2005 SIAM international conference on data mining, Society for Industrial and Applied Mathematics. Apr. 21, 2005, pp. 449-460.
Tsoumakas, Grigorios, et al. "Mining multi-label data", InData mining and knowledge discovery handbook Springer, Boston, MA., Jul. 7, 2010, pp. 667-685.
Anonymous. "Bike Sharing", Kaggle User Content. Aug. 4, 2021, pp. 1-45.
Elfeky, Mohamed, et al. "Periodicity detection in time series databases", Knowledge and Data Engineering, IEEE Transactions on, vol. 17, No. 7. Jul. 2005, pp. 1-13.
Agrawal, Samarth. "Feature Engineering of DateTime Variables for Data Science, MachineLearning", KDnuggets. Jun. 7, 2021, pp. 1-10.
Anonymous. "Complete Guide To Datetime Parsing With Pandas", Analytics India Magazine. Mar. 5, 2021, pp. 1-27.
Zevan. "Unit-2-Project", Baltimore_Crime.ipynb. Aug. 4, 2021, pp. 1-18.
Lakshmanan, Swetha. "Simple Ways to Extract Features From DateVariable Using Python", Medium. May 1, 2019, pp. 1-7.
Maharana, Siddhant. "atlanta-crime-prediction", Feature_Engineering.ipynb. Aug. 4, 2021, pp. 1-6.
Zymrael. "wattnet-fx-trading", 03_datasets_alignment (extended).ipynb. Aug. 4, 2021, pp. 1-12.

* cited by examiner

954C

954N

950

910

954B

954A

DATE AND TIME FEATURE IDENTIFICATION

BACKGROUND

The present invention generally relates to data pre-processing, and, more particularly, to identifying date and time features for use in machine learning systems.

Date and time features may be added to automatically generated data to improve accuracy of machine learning models such as prediction. For example, data scientists often add date and time features to training data for data pre-processing. However the identifying of the date and time features depends on the data scientists' knowledge and skills.

SUMMARY

A method for text processing includes building a knowledge base using column names and associated functions from a code base. Classifiers are trained using the knowledge base and are cross-validated to determine accuracy scores. Text is processed using a selected classifier having a highest accuracy score from the classifiers to determine date/time features.

A system for text processing includes a hardware processor and a memory that includes a computer program. When executed by the hardware processor, the computer program causes the hardware processor to build a knowledge base using column names and associated functions from a code base, to train a plurality of classifiers using the knowledge base, to cross-validate the plurality of classifiers to determine accuracy scores, and to process text using a selected classifier having a highest accuracy score from the plurality of classifiers to determine date/time features.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Data scientists often add date and time features to training data for data pre-processing, however the identifying of the date and time features depends on the data scientists' knowledge and skills. In some cases, the number of potential date and time features can be very large, based on different combinations of possible date and type feature types.

Exemplary date and time features, which may identify a particular column of data in a table or database, include "year," "date," "time," "month," "day," "hour," "minute," "second," "microsecond," "nanosecond," "week," "weekofyear," "dayofweek," "day_of_week," "weekday," "dayofyear," "day_of_year," "quarter," "is_month_start," "is_month_end," "is_quarter_start," "is_quarter_end," "is_year_start," "is_year_end," "daysinmonth," "days_in_month," and others. As is readily apparent, there may be countless variations on these types of date and time features and others. Additionally, it is difficult to predict what combinations of date and time features might be present within a given dataset, meaning that a very large number of potential combinations may be checked to be exhaustive.

Date and time features may therefore be automatically identified for column names of a given dataset. These features provide superior accuracy in a machine learning model that is trained using the dataset. Additionally, date and time features may be added to complete datasets which lack them. Knowledge-based feature identification can be used to extract column names of datasets into bag-of-words documents and to label date and time features on them. A multi-label document can be created as a knowledge base. When given column names of a target dataset to add temporal features, the column names may be classified using the knowledge base to identify the class label.

Column-concept mapping may be used to identify concepts that correspond to column names. This may be performed by determining a Cartesian product of confidence scores of concepts in a column name. A column name may include, for example, a word or a set of words. The top n concepts for a column may be selected, based on the Cartesian product. Additionally, or alternatively, a number of date time features may be determined by cross-validation with the knowledge base to find an average number of the features that cover the true number of labels, determined from the results of cross-validation with multiple classifiers. This number of date and time features that are to be added may be determined using the knowledge base alone.

Figure 1:
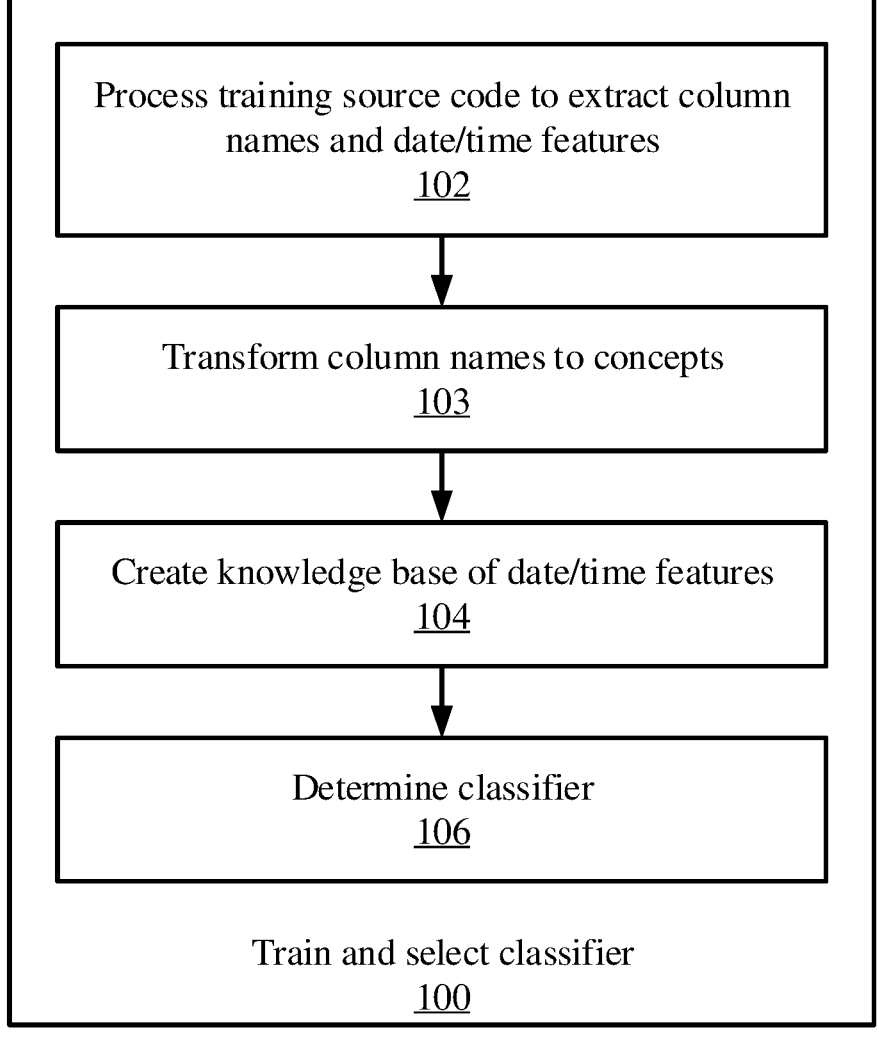
FIG. 1 is a block/flow diagram that shows a training and selection method for picking a classifier to identify date and time information, in accordance with an embodiment of the present invention.

Referring now to FIG. 1, a method for identifying date/time features is shown. Block 102 extracts information from an existing codebase, for example by accessing a variety of known source code libraries and repositories. Block 102 may include parsing the source code, analyzing the data flow thereof, and extracting column names. Parsing the source code may include processing to extract variable names and application programming interface (API) names.

The data flow analysis may include identifying the sequence in which data transfers, use, and transformations are performed during the execution of a program. A control-flow graph can be used as a graphical representation of the program. The data flow analysis may include both forward analysis and backward analysis. Block 102 may further include referring to a corresponding API to identify labels for these column names, thereby creating a training dataset. The API labels for the source code may identify which column names refer to date/time information. For example, if the source code includes a step, "df['current_year']=df ['dat'].dt.year," then the column name would be "current_year" and the date/time feature would be "year." Thus, formulas can be extracted from the source code that represent a calculation of a date/time feature based on date/time data.

This extraction may include a tokenization process, which breaks the column names down into parts. Tokenization may be performed by identifying common transition characters, such as "_", which indicate a break between words. In some cases, column names may lack such transition characters entirely. For example, if the column name were, "day-ofweek," then tokenization would have no clear transition to use. In such cases, tokenization may be performed using a dictionary-based approach, where commonly used words are identified within the string. For example, a dictionary-based tokenization may identify the term "day" and "week" within the column name "dayofweek," and could use this information to split the column name into tokens.

As used herein, the term "formula" refers to an operation that is performed using values of the columns. As above, the term, "df['current_year']=df['date'].dt.year," identifies a particular formula that makes use of column names ('current_year' and 'date') as well as invokes the name of an API function (dt.year). This information can be extracted from the formula to identify date and time information in the columns, as the API function indicates some predetermined functionality that may relate to dates and times.

Block 103 transforms the column name information to corresponding concepts using concept mapping. This transformation may be performed because column names are often too specific or abbreviated, which makes it difficult to directly compare them to one another. By transforming the column names to corresponding concepts, the different column names can be compared with one another using their respective associated concepts.

The concepts may be determined by selecting n top scores using a direct product, also known as a Cartesian product, for confidence scores that are transformed from column names. Consider, for example, a column name "NYC_case". This term can be tokenized to split it into two component terms: "NYC" and "case". The first term may be transformed to concepts, with each proposed concept having an associated confidence score. Thus, the "NYC" part of the column name may have a first proposed concept of "New York City", with a confidence score of 0.95, and a second proposed concept of "new year concert", with a confidence score of 0.20. Similarly, the "case" part of the column name may have a first proposed concept of "incident case", with a confidence score of 0.80, and a second proposed concept of "legal case", with a confidence score of 0.70. The direct product in this example could produce a first concept of "New York City incident case", with a Cartesian product score of 0.76, a second concept of "New York City legal case", with a Cartesian product score of 0.66, and so on. The top n such concepts may be selected to represent the column, where n may be user-settable parameter. Block 104 may generate a knowledge base from the concepts and the API features. For example, the concepts that correspond to the extracted columns may be represented in the knowledge base as data, and the API features may be represented as labels on the data.

Concept mapping is a technique that generates a score that characterizes ontological relationships between two inputs. Thus, in this context, concept mapping may be used to provide a score which describes how likely a given input (e.g., the column name) may relate to a particular concept from a concept database. This makes it possible to automatically attach meaning to what may otherwise be difficult-to-parse column name information.

Block 106 selects a classifier with a highest labeling accuracy, for example from a group of classifiers. The number of features to be added may be set as M by determining a number of labels that corresponds to an average of a number of labels for known concepts. This may include cross-validation with the group of classifiers. Exemplary classifiers may be trained using a variety of techniques, such as cosine similarity, K-nearest neighborhood, naïve Bayers, support vector machine, and neural networks. The classifiers may be pre-trained using the knowledge base, including the concepts associated with source code column names and the API labels. The selected classifier may then be used to identify date and time features from new, unlabeled column information.

Figure 2:
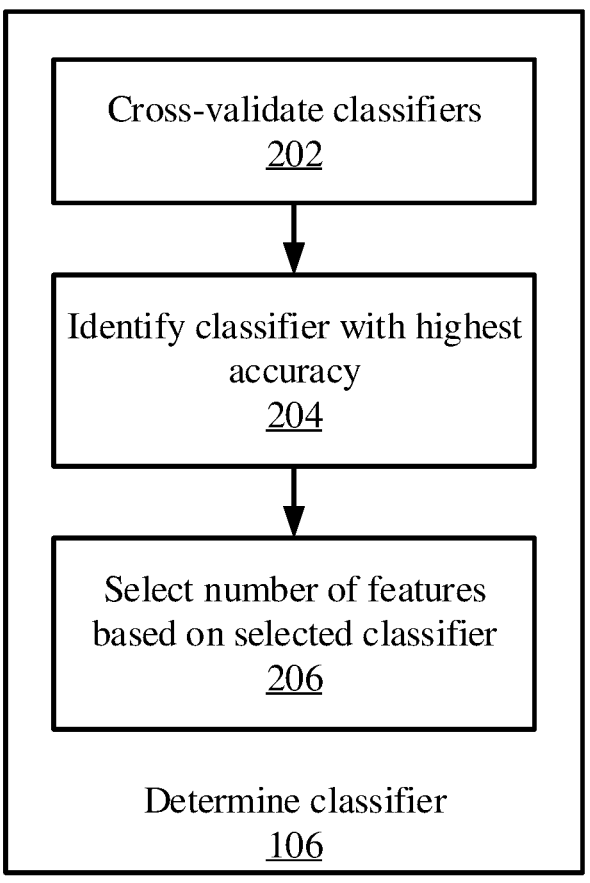
FIG. 2 is a block/flow diagram that shows a classifier selection method for determining which classifier provides accurate results, in accordance with an embodiment of the present invention.

Referring now to FIG. 2, additional detail on the selection of the classifiers in block 106 is shown. Block 202 performs cross-validation for each classifier. This may include testing a variety of different classifiers, using different types of machine learning and training. For example, various neural network architectures may be used as text classifiers. This cross-validation will be described in greater detail below.

Having performed cross-validation, a classification value $A_n$ may be determined for each respective classifier n. The classifier having the highest classification value may be selected for use. Based on this selected classifier, a number of features M may be selected, corresponding to a number of labels $M_n$ that the selected classifier uses to cover its ground truth labels. For example, in case that true labels are "year", "date", and "month", and predicted labels are "year", "minute", "date", and "month", the prediction covers all true labels and the number of labels M may be set as four.

Figure 3:
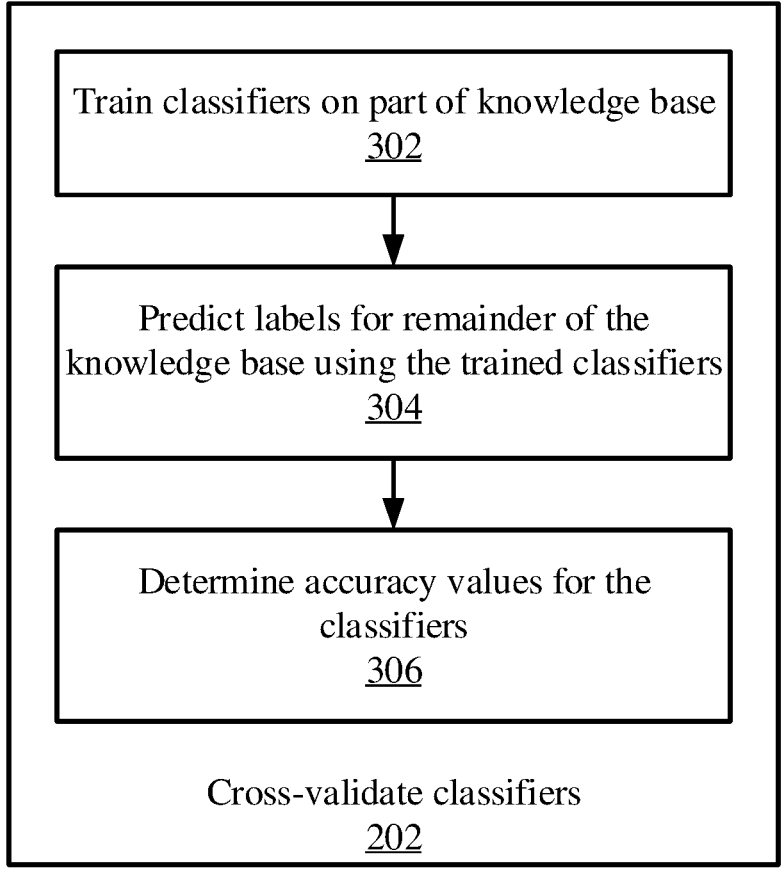
FIG. 3 is a block/flow diagram that shows a cross-validation method for determining accuracy values for classifiers, in accordance with an embodiment of the present invention.

Referring now to FIG. 3, additional detail on the cross-validation of the classifiers is shown. Block 302 trains classifiers on part of the knowledge base that is generated in in block 104, described above, using the labels that are extracted from API function names. Cross-validation uses a training part of the knowledge base, leaving a part aside for validation. Block 304 then uses the remainder of the knowledge base to predict labels with the trained classifiers. Block 306 determines the accuracy of the outputs of the classifiers that were generated block 304, comparing the predicted labels to the labels indicated by the knowledge base. In this manner, accuracy values $A_n$ can be generated for the different classifiers, which may later be used to select a most accurate classifier.

Figure 4:
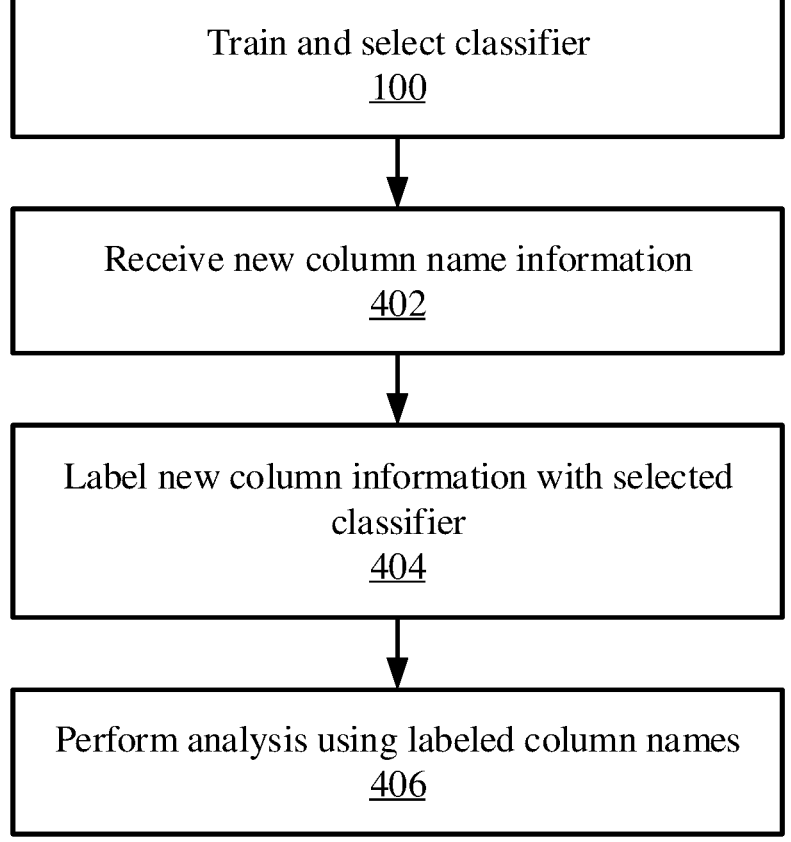
FIG. 4 is a block/flow diagram of a method for identifying date/time information within input text and performing an analysis on the same, in accordance with an embodiment of the present invention.

Referring now to FIG. 4, a method of identifying and analyzing date and time information is shown. Block 100 trains and selects a classifier as described above, using preexisting source code bases to generate a knowledge base that associates column names with API function names and training a classifier based on that knowledge base. Block 402 receives new column name information. This information may be received from, for example, a new code base, a database, log files, or any other appropriate source.

Block 404 labels the new column name information with the classifier provided by block 100. This identifies columns which refer to date and time information. Block 406 then performs downstream analysis that uses the labeled column name information. For example, this analysis may include automated feature engineering, which may be used to represent information from a dataset using appropriate features. Automated feature engineering may be used to, for example, combine multiple datasets into a single table, where features may be selected to help merge related columns.

Figure 5:
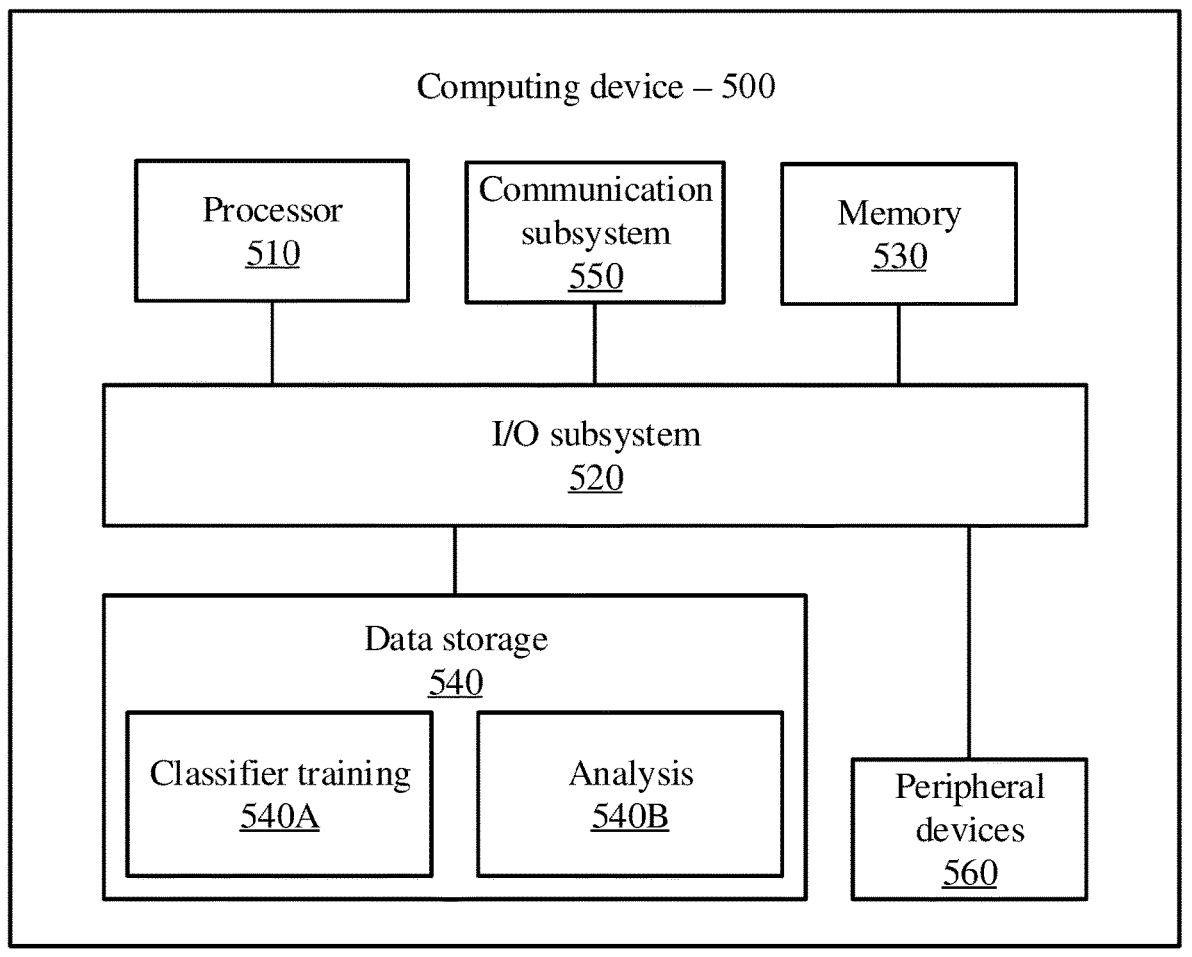
FIG. 5 is a block diagram of a computing device that can perform text processing and analysis to identify date/time information, in accordance with an embodiment of the present invention.

FIG. 5 is a block diagram showing an exemplary computing device 500, in accordance with an embodiment of the present invention. The computing device 500 is configured to identify date and time features.

The computing device 500 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 500 may be embodied as a one or more compute sleds, memory sleds, or other racks, sleds, computing chassis, or other components of a physically disaggregated computing device.

As shown in FIG. 5, the computing device 500 illustratively includes the processor 510, an input/output subsystem 520, a memory 530, a data storage device 540, and a communication subsystem 550, and/or other components and devices commonly found in a server or similar computing device. The computing device 500 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 530, or portions thereof, may be incorporated in the processor 510 in some embodiments.

The processor 510 may be embodied as any type of processor capable of performing the functions described herein. The processor 510 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 530 may be embodied as any type of volatile or non-volatile memory or data storage capable of performing the functions described herein. In operation, the memory 530 may store various data and software used during operation of the computing device 500, such as operating systems, applications, programs, libraries, and drivers. The memory 530 is communicatively coupled to the processor 510 via the I/O subsystem 520, which may be embodied as circuitry and/or components to facilitate input/output operations with the processor 510, the memory 530, and other components of the computing device 500. For example, the I/O subsystem 520 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.), and/or other components and subsystems to facilitate the input/output operations. In some embodiments, the I/O subsystem 520 may form a portion of a system-on-a-chip (SOC) and be incorporated, along with the processor 510, the memory 530, and other components of the computing device 500, on a single integrated circuit chip.

The data storage device 540 may be embodied as any type of device or devices configured for short-term or long-term storage of data such as, for example, memory devices and circuits, memory cards, hard disk drives, solid state drives, or other data storage devices. The data storage device 540 can store program code 540A for training a classifier that identifies date and time features and program code 540B that analyzes information based on such identified features. The communication subsystem 550 of the computing device 500 may be embodied as any network interface controller or other communication circuit, device, or collection thereof, capable of enabling communications between the computing device 500 and other remote devices over a network. The communication subsystem 550 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 500 may also include one or more peripheral devices 560. The peripheral devices 560 may include any number of additional input/output devices, interface devices, and/or other peripheral devices. For example, in some embodiments, the peripheral devices 560 may include a display, touch screen, graphics circuitry, keyboard, mouse, speaker system, microphone, network interface, and/or other input/output devices, interface devices, and/or peripheral devices.

Of course, the computing device 500 may also include other elements (not shown), as readily contemplated by one of skill in the art, as well as omit certain elements. For example, various other sensors, input devices, and/or output devices can be included in computing device 500, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. Further, in another embodiment, a cloud configuration can be used (e.g., see FIGS. 9-10). These and other variations of the processing system 500 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 6:
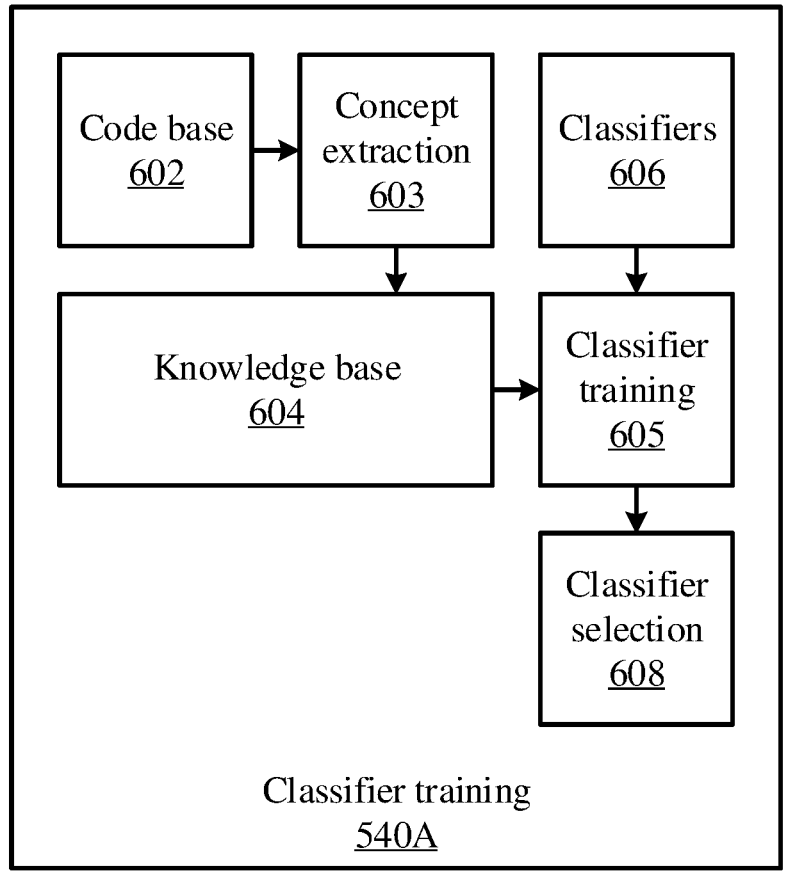
FIG. 6 is a block diagram providing detail on a computer program for classifier training and selection, in accordance with an embodiment of the present invention.

Referring now to FIG. 6, additional detail on the classifier training 540A is shown. A code base 602 is generated, for example by accessing public or private source code repositories. The code base 602 refers to predetermined API functions, which are used by concept extraction 603 to label concepts that are associated with column names extracted from the code base 602. This generates a knowledge base 604, which associates column names and concepts with the API labels.

The knowledge base 604 is used as training data for classifier training 605. The classifier training 605 may train multiple classifiers 606 with the knowledge base 604. Classifier selection 608 may use cross-validation to identify a most accurate trained classifier for use in subsequent analysis. As noted above, the classifiers 606 may take many different functional forms. One specifically contemplated type of classifier architecture includes neural network architectures.

A neural network is a generalized system that improves its functioning and accuracy through exposure to additional empirical data. The neural network becomes trained by exposure to the empirical data. During training, the neural network stores and adjusts a plurality of weights that are applied to the incoming empirical data. By applying the adjusted weights to the data, the data can be identified as belonging to a particular predefined class from a set of classes or a probability that the inputted data belongs to each of the classes can be outputted.

The empirical data, also known as training data, from a set of examples can be formatted as a string of values and fed into the input of the neural network. Each example may be associated with a known result or output. Each example can be represented as a pair, (x, y), where x represents the input data and y represents the known output. The input data may include a variety of different data types, and may include multiple distinct values. The network can have one input node for each value making up the example's input data, and a separate weight can be applied to each input value. The input data can, for example, be formatted as a vector, an array, or a string depending on the architecture of the neural network being constructed and trained.

The neural network "learns" by comparing the neural network output generated from the input data to the known values of the examples, and adjusting the stored weights to minimize the differences between the output values and the known values. The adjustments may be made to the stored weights through back propagation, where the effect of the weights on the output values may be determined by calculating the mathematical gradient and adjusting the weights in a manner that shifts the output towards a minimum difference. This optimization, referred to as a gradient descent approach, is a non-limiting example of how training may be performed. A subset of examples with known values that were not used for training can be used to test and validate the accuracy of the neural network.

During operation, the trained neural network can be used on new data that was not previously used in training or validation through generalization. The adjusted weights of the neural network can be applied to the new data, where the weights estimate a function developed from the training examples. The parameters of the estimated function which are captured by the weights are based on statistical inference.

Figure 7:
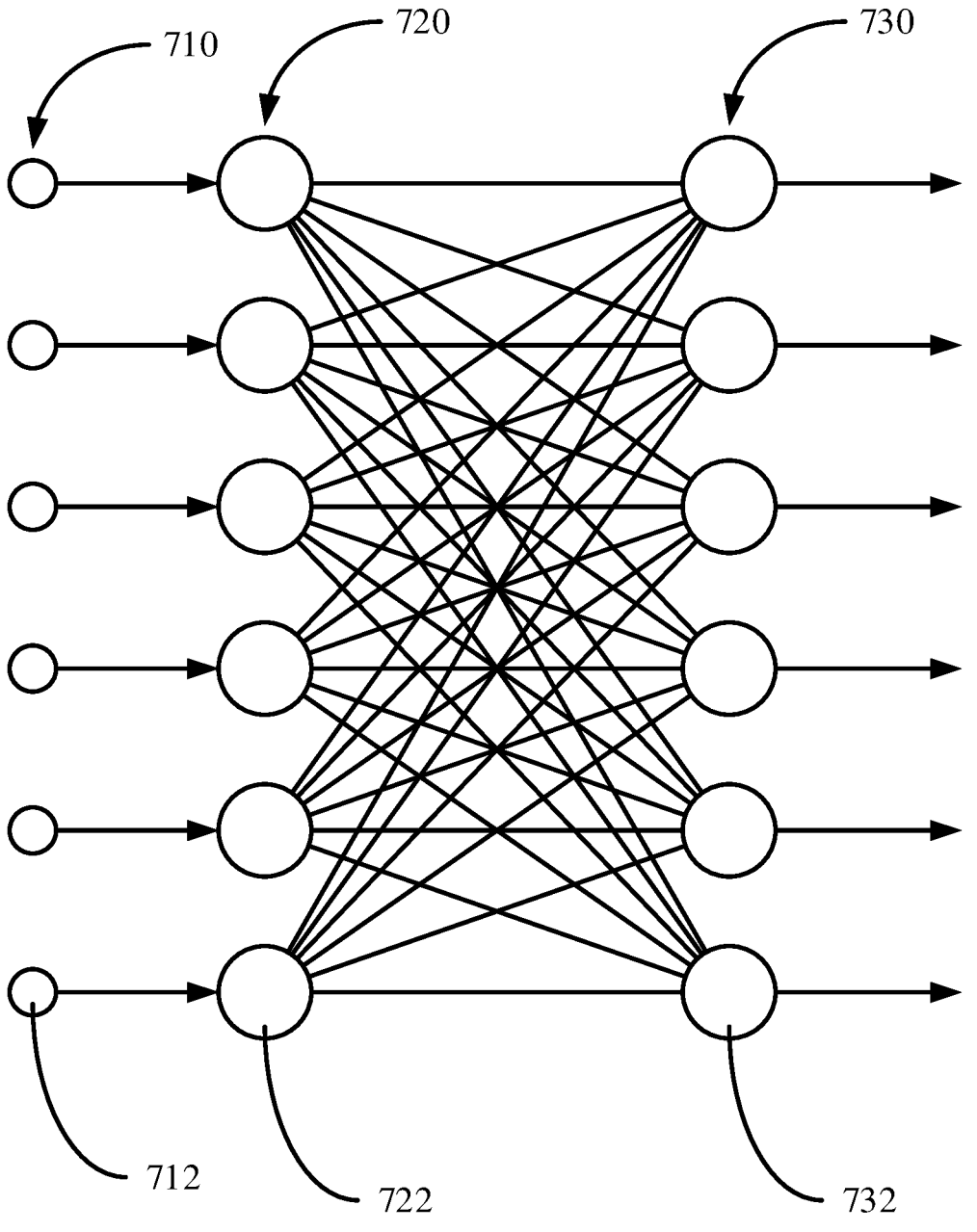
FIG. 7 is a diagram showing an exemplary neural network architecture, in accordance with an embodiment of the present invention.

Referring now to FIG. 7, an exemplary neural network architecture is shown. In layered neural networks, nodes are arranged in the form of layers. An exemplary simple neural network has an input layer 720 of source nodes 722, and a single computation layer 730 having one or more computation nodes 732 that also act as output nodes, where there is a single computation node 732 for each possible category into which the input example could be classified. An input layer 720 can have a number of source nodes 722 equal to the number of data values 712 in the input data 710. The data values 712 in the input data 710 can be represented as a column vector. Each computation node 732 in the computation layer 730 generates a linear combination of weighted values from the input data 710 fed into input nodes 720, and applies a non-linear activation function that is differentiable to the sum. The exemplary simple neural network can perform classification on linearly separable examples (e.g., patterns).

Figure 8:
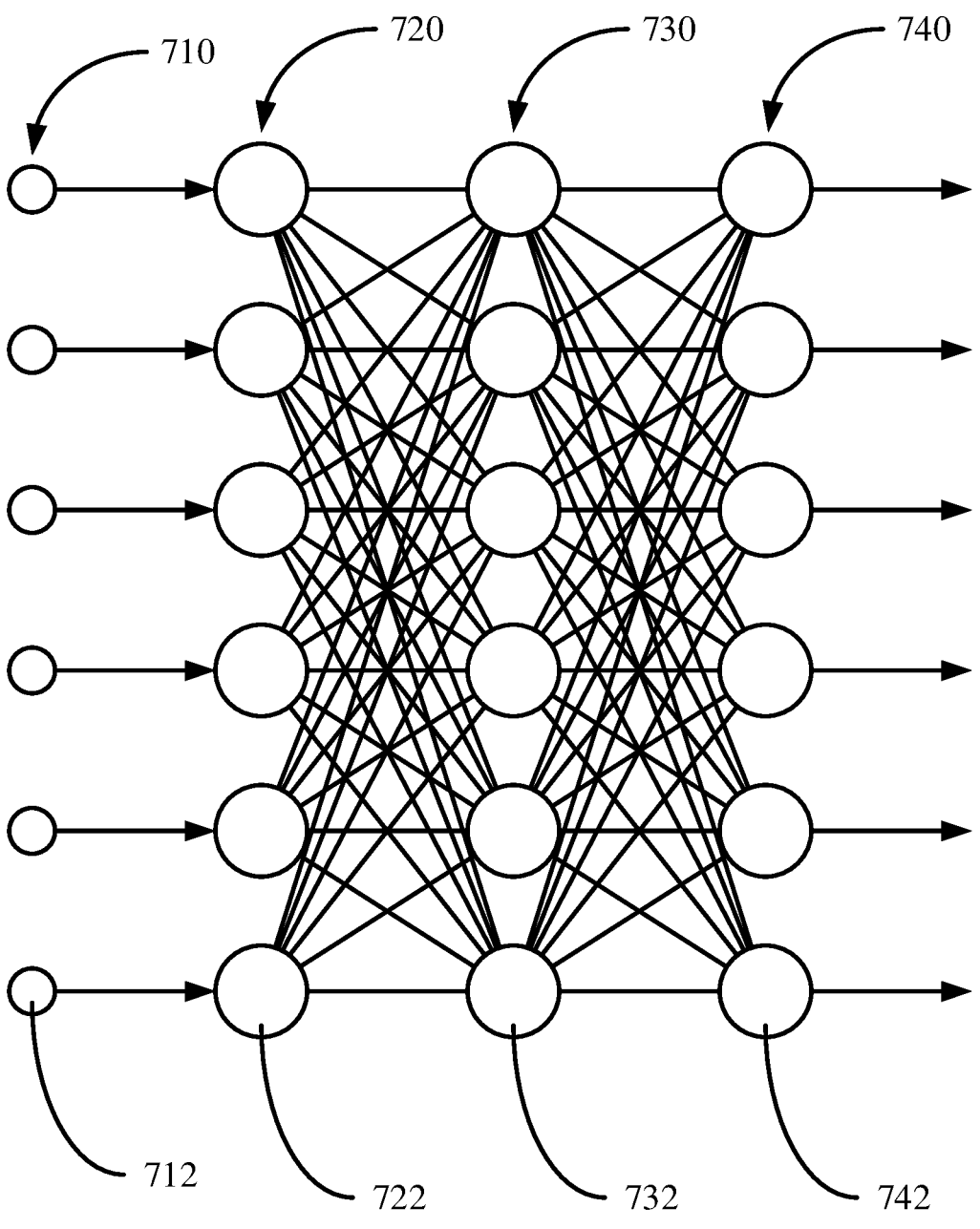
FIG. 8 is a diagram showing an exemplary deep neural network architecture, in accordance with an embodiment of the present invention.

Referring now to FIG. 8, an exemplary deep neural network architecture is shown. A deep neural network, such as a multilayer perceptron, can have an input layer 720 of source nodes 722, one or more computation layer(s) 730 having one or more computation nodes 732, and an output layer 740, where there is a single output node 742 for each possible category into which the input example could be classified. An input layer 720 can have a number of source nodes 722 equal to the number of data values 712 in the input data 710. The computation nodes 732 in the computation layer(s) 730 can also be referred to as hidden layers, because they are between the source nodes 722 and output node(s) 742 and are not directly observed. Each node 732, 742 in a computation layer generates a linear combination of weighted values from the values output from the nodes in a previous layer, and applies a non-linear activation function that is differentiable over the range of the linear combination. The weights applied to the value from each previous node can be denoted, for example, by $w_1, w_2, \ldots w_{n-1}, w_n$. The output layer provides the overall response of the network to the inputted data. A deep neural network can be fully connected, where each node in a computational layer is connected to all other nodes in the previous layer, or may have other configurations of connections between layers. If links between nodes are missing, the network is referred to as partially connected.

Training a deep neural network can involve two phases, a forward phase where the weights of each node are fixed and the input propagates through the network, and a backwards phase where an error value is propagated backwards through the network and weight values are updated.

The computation nodes 732 in the one or more computation (hidden) layer(s) 730 perform a nonlinear transformation on the input data 712 that generates a feature space. The classes or categories may be more easily separated in the feature space than in the original data space.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
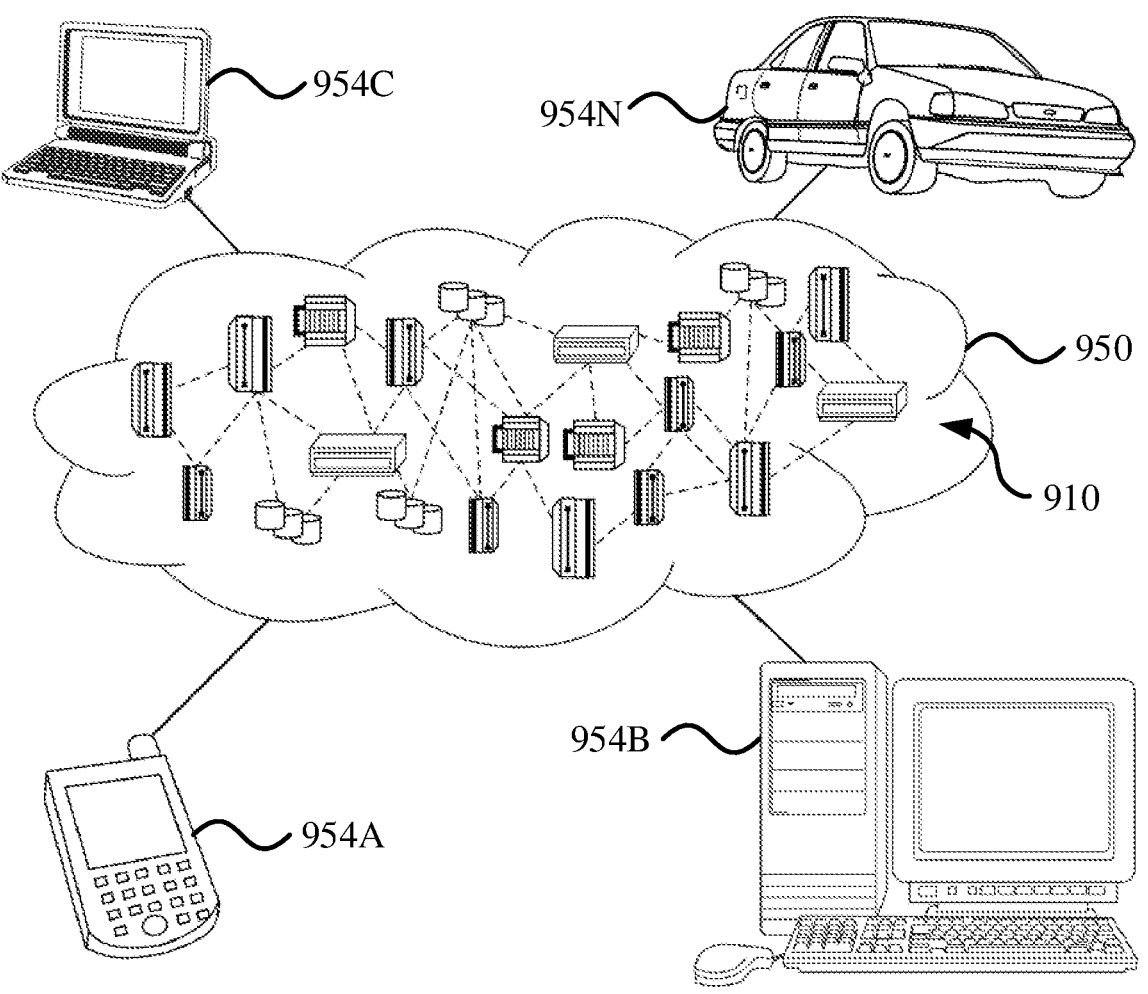
FIG. 9 depicts a cloud computing environment according to an embodiment of the present invention.

Referring now to FIG. 9, illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
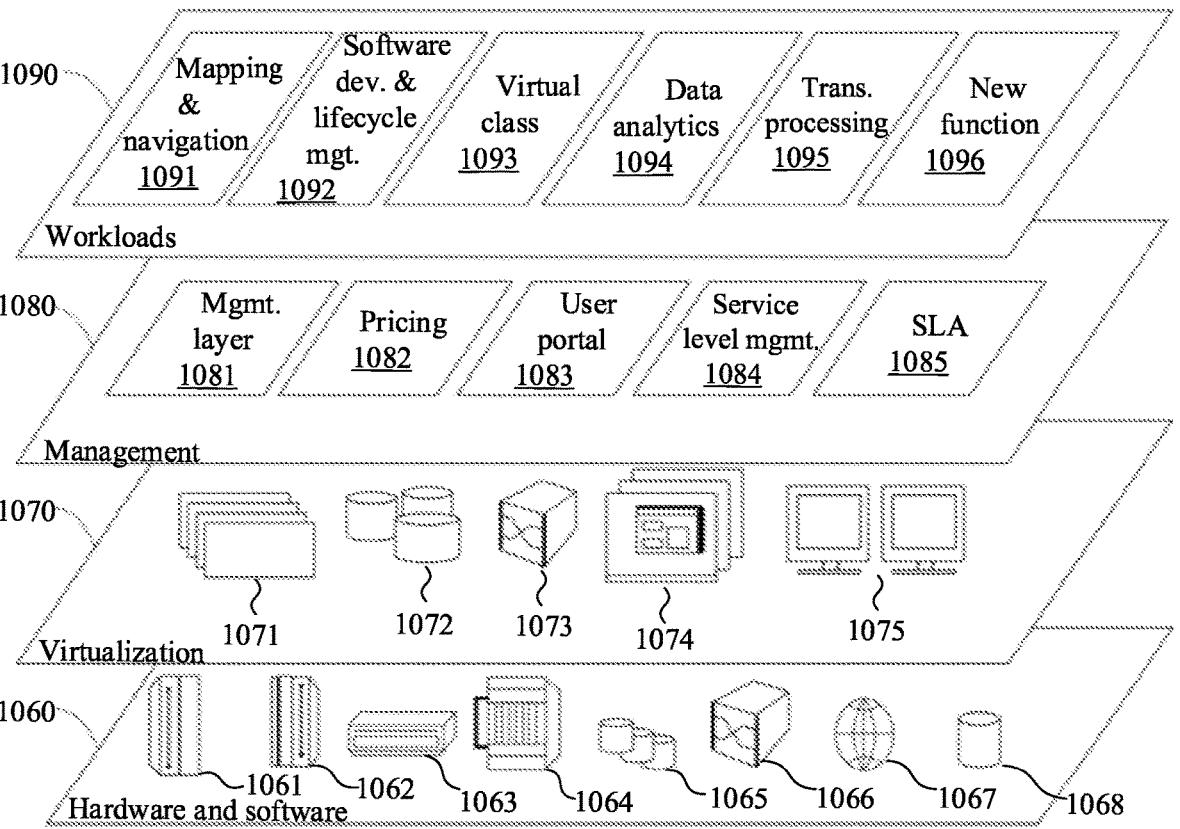
FIG. 10 depicts abstraction model layers according to an embodiment of the present invention.

Referring now to FIG. 10, a set of functional abstraction layers provided by cloud computing environment 1050 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and date/time features identification 1096.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of date/time features identification for data pre-processing (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for text processing, comprising:
   building a knowledge base of date/time features using column names and associated functions from parsed computer source codes extracted from a code base;
   training a plurality of classifiers using the knowledge base;
   cross-validating the plurality of classifiers to determine accuracy scores by comparing labels generated in output layers of the plurality of classifiers using a validation dataset to the knowledge base of date/time features;
   processing text using a selected classifier having a highest accuracy score from the plurality of classifiers to determine date/time features from the text knowledge base of date/time features;
   generating new column information for database tables by merging column data with the date/time features determined from the text knowledge base of date/time features; and
   training machine learning models with the new column information for the database tables to increase accuracy of prediction of the machine learning models.

2. The method of claim 1, wherein building the knowledge base includes transforming the column names to concepts using conceptual mapping.

3. The method of claim 1, wherein the functions are application programming interface (API) functions with predefined functions relating to date/time features.

4. The method of claim 1, wherein building the knowledge base includes determining a number of features to associate with each column name based on the cross-validating.

5. The method of claim 4, wherein the number of features is selected as a number of ground truth labels of the selected classifier.

6. The method of claim 1, wherein the plurality of classifiers includes a neural network classifier.

7. The method of claim 1, further comprising performing automated feature engineering by determining parts of different datasets that correspond to similar date/time features to generalize date/time features of the parts of the different datasets and to merge related columns in the database tables that correspond with the similar date/time features.

8. The method of claim 1, wherein cross-validating includes testing the trained classifiers with the validation dataset which includes a reserve portion of the knowledge base that was not used for training.

9. The method of claim 8, wherein the accuracy scores reflect an accuracy of each of the plurality of classifiers with respect to generated labels for the reserve portion of the knowledge base.

10. The method of claim 1, wherein the text is derived from a new code base, a database, or a log file.

11. A computer program product for text processing, the computer program product comprising a computer readable storage medium having program instructions embodied therewith, the program instructions being executable by a hardware processor to cause the hardware processor to:
   build a knowledge base of date/time features using column names and associated functions from parsed computer source codes extracted from a code base;

train a plurality of classifiers using the knowledge base;

cross-validate the plurality of classifiers to determine accuracy scores by comparing labels generated in output layers of the plurality of classifiers using a validation dataset to the knowledge base of date/time features;

process text using a selected classifier having a highest accuracy score from the plurality of classifiers to determine date/time features from the knowledge base of date/time features;

generate new column information for database tables with the date/time features determined from the text knowledge base of date/time features; and train machine learning models with the new column information for the database tables to increase accuracy of prediction of machine learning models.

12. A system for text processing, comprising:

a hardware processor; and a memory that includes a computer program, which, when executed by the hardware processor, causes the hardware processor to:

build a knowledge base of date/time features using column names and associated functions from parsed computer source codes extracted from a code base;

train a plurality of classifiers using the knowledge base;

cross-validate the plurality of classifiers to determine accuracy scores by comparing labels generated in output layers of the plurality of classifiers using a validation dataset to the knowledge base of date/time features;

process text using a selected classifier having a highest accuracy score from the plurality of classifiers to determine date/time features from the text knowledge base of date/time features;

generate new column information for database tables with the date/time features determined from the text knowledge base of date/time features; and train machine learning models with the new column information for the database tables to increase accuracy of prediction of machine learning models.

13. The system of claim 12, wherein the computer program further causes the hardware processor to transform the column names to concepts using conceptual mapping.

14. The system of claim 12, wherein the functions are application programming interface (API) functions with predefined functions relating to date/time features.

15. The system of claim 12, wherein the computer program further causes the hardware processor to determine a number of features to associate with each column name based on the cross-validating.

16. The system of claim 15, wherein the number of features is selected as a number of ground truth labels of the selected classifier.

17. The system of claim 12, wherein the plurality of classifiers includes a neural network classifier.

18. The system of claim 12, wherein the computer program further causes the hardware processor to perform automated feature engineering by determining parts of different datasets that correspond to similar date/time features to generalize date/time features of the parts of the different datasets and to merge related columns in the database tables that correspond with the similar date/time features.

19. The system of claim 12, wherein cross-validation includes testing the trained classifiers with the validation dataset which includes a reserve portion of the knowledge base that was not used for training.

20. The system of claim 19, wherein the accuracy scores reflect an accuracy of each of the plurality of classifiers with respect to generated labels for the reserve portion of the knowledge base.

* * * * *